United States Patent [19]
Blount et al.

[11] Patent Number: 5,724,943
[45] Date of Patent: Mar. 10, 1998

[54] ELECTRONIC FUEL INJECTION SYSTEM AND IGNITION SYSTEM

[76] Inventors: David H. Blount, 6728 Del Cerro Blvd, San Diego, Calif. 92120; James O. Blount, 5012 Lawson Ave., Gulfport, Miss. 39501

[21] Appl. No.: 700,879

[22] Filed: Aug. 21, 1996

Related U.S. Application Data

[63] Continuation-in-part of Ser. No. 348,320, Dec. 2, 1994, Pat. No. 5,549,090.

[51] Int. Cl.⁶ .................................................. F22D 1/00
[52] U.S. Cl. ......................... 123/414; 123/476; 123/617
[58] Field of Search ............................. 123/414, 476, 123/617

[56] References Cited

U.S. PATENT DOCUMENTS

| | | | |
|---|---|---|---|
| 3,373,729 | 3/1968 | Lemen | 123/617 |
| 3,749,070 | 7/1973 | Oishi et al. | 123/415 |
| 3,861,370 | 1/1975 | Howard | 123/617 |
| 4,771,754 | 9/1988 | Reinke | 123/533 |
| 4,808,934 | 2/1989 | Yokoyama et al. | 123/617 |
| 4,907,178 | 3/1990 | Ogawa et al. | 123/414 |
| 5,549,090 | 8/1996 | Blount et al. | 123/414 |

*Primary Examiner*—Noah P. Kamen

[57] ABSTRACT

A combined electronic ignition and fuel injection system for internal combustion engines utilizes a non-magnetic disk, attached to the engines shaft and rotates with the shaft, and contains permanent magnet along the periphery of the disk at intervals defined by the shaft's position for each cylinder group. The magnets develop voltage timing pulses within pick-ups coils which are connected to circuits for amplifying and shaping the timing signals. The coil driver switch charges the ignition coil and the spark plugs are then fired, then in another cylinder chamber the fuel injectors are opened, and the fuel is injected into the cylinder chamber. This electronic ignition and fuel injection system is an improvement and a simpler system than that which is usually utilized in internal combustion engines, because it does not require the use of a computer or distributor. It is particularly useful in the rotary-reciprocal combustion engines, and may be used in rotary and reciprocal combustion engines.

7 Claims, 6 Drawing Sheets

INJECTION CONTROL SIGNALS

FUEL-AIR INJECTOR MIXER

ELECTRONIC FUEL INJECTION SYSTEM AND IGNITION SYSTEM

The fuel injection system and ignition system application is a continuation in part of U.S. application Ser. No. 08/348,320 filed Dec. 2, 1994, now U.S. Pat. No. 5,549,090.

BACKGROUND OF THE INVENTION

This invention relates to the method to produce a novel combined electronic fuel injection and ignition system for combustion engines such as rotary-reciprocal engines, rotary engines and reciprocal engines. This novel system does not utilize a computer nor a distributor, and is an improvement over the fuel injection systems and ignition systems that is utilized in combustion engines now. It is also simpler because it is a combination of an electronic fuel and ignition system and does not require the use of a computer or distributor.

There is a basic need for the fuel injection and ignition systems on rotary-reciprocal combustion engines to be different from the known fuel injection and ignition systems of rotary or reciprocal combustion engines because rotary-reciprocal combustion engines fire two or more times in each chamber per revolution, and may require two or more chambers to be fired at the same time. The rotary-reciprocal combustion engines, as illustrated in U.S. Pat. Nos. 5,152,257; 5,156,115; 5,301,637 and 5,433,176, may be designed as single engines, double or multiple engines on the Same shaft which require a completely different and novel fuel injection and ignition system than that required by a rotary or reciprocal engine. The electronic fuel and ignition systems of this invention may also be utilized on rotary, rotary with vanes and reciprocal combustion engines. The fuel injection system of this invention is also designed to be utilized on various type of rotary engines such as the single and double two cycle engines, the single and double four cycle engines and multiple engines of these two types. Two or more of the cylinders may be fired at the same time. The object of this invention is to provide novel fuel injection and ignition systems for rotary-reciprocal, rotary and reciprocal combustion engines.

In order to accommodate the various numbers of cylinders to be fuel injected at the same time and then fired at the same time, and the number of fuel injections and firings per revolution vary with the different type of engines, this fuel injection and ignition system utilizes a non-conductive disk or disks which is attached and rotates with the shaft. This disk or disks contains multiple magnets on the peripheral area of the disk at the necessary points or degrees to activate pick-up coils. These pick-up coils may be placed at the necessary points or degrees to activate the fuel injection and ignition system of combustion engines.

The timing mechanism consist of a dust cover, a guide plate which rotates with the shaft, a stabilizing spring which is attached to the guide plate, and a non-magnet disk which is made up of a magnet holding ring and an inner base for the magnet holding ring. The magnet holding ring and its inner base which rotates with the shaft contains magnets on the peripheral surface, and they induce approximately 0.250 to 0.5 volt pulses into the pick-up coils. The pick-up coils are mounted on a mounting ring which is attached to the engine and does not rotate with the shaft. Its basic timing pulse is synchronized with the intake stroke. In double two or four cycle rotary-reciprocal combustion engines the fuel injection timing pulse is synchronized with the intake stroke by utilizing the opposing engine's firing trigger pulse, thus saving electronic components. This arrangement is possible because the design of the double rotary-reciprocal combustion engines has one engine compressed and firing while the other engine is taking in fuel and air. The firing pulse of one engine is used to trigger the fuel injection system of the other engine's opposing intake cylinder. This firing pulse may also be utilized to trigger the admission of compressed air into the cylinder chamber. This arrangement may also be utilized in a reciprocal combustion engine with multiple cylinders. The firing pulse could trigger one cylinder with compressed air and gas to fire and the same pulse could trigger the fuel to be injected into an intake cylinder chamber. The rotary engine would have magnets rotating with the engines shaft, and the magnets would be located at the proper degree to trigger the ignition system and the fuel system. The ignition and fuel injection systems may have the same pick-up coil or use separate pickup coils.

FUEL SYSTEM COMPONENTS

The fuel system may be designed for two cycle rotary-reciprocal combustion engines wherein the fuel is injected into the intake port along with compressed air into the cylinder chamber, directly during intake or after the exhaust ports are closed during the starting of the compression stroke. Both the compressed air and fuel may be injected into the cylinder chambers after the exhaust ports are closed or during the compression stroke. High pressure pumps may be utilized to pump the fuel at 200 psi or more, especially for high pressure engines. The air may also be injected into the cylinder chambers under high pressure before or after the exhaust valves close. Less pressure is needed to inject fuel into the intake ports, of four cycle engines, approximately 30 psi is utilized. The fuel pressure regulator is utilized to adjust the fuel pressure at the desired level. A regulator may also be utilized to regulate the air pressure.

In four cycle rotary-reciprocal combustion engines the fuel may be injected into the intake port or directly into the cylinder chamber, The fuel may be injected during the intake stroke along with the vacuumed in air or the air may be injected under pressure directly into the cylinder chamber along with the fuel.

DESCRIPTION OF THE DRAWINGS

Other objects of the invention will become apparent upon reading the annexed detail description in connection with the drawings in which.

3

Figure 10:
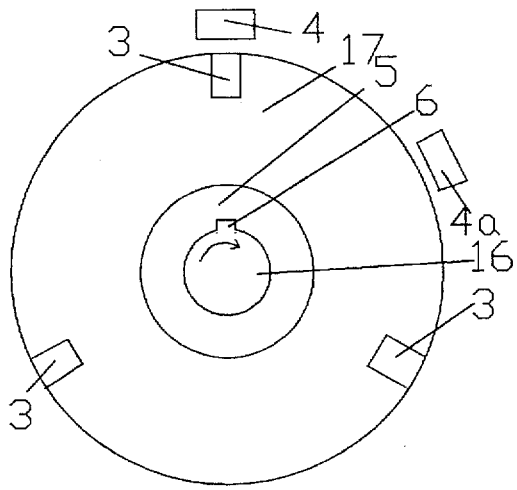
Figure 7:
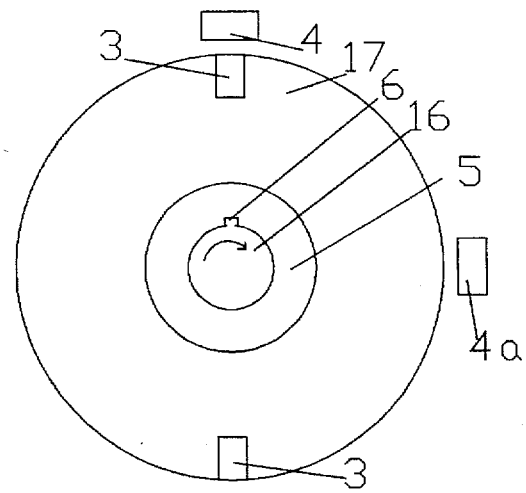
FIG. 7 is a frontal view of a disk of non-magnetic metal or plastic with magnets and pickup coils for a double two cycle engine with two cylinder or a four cylinder reciprocal engine.
Figure 8:
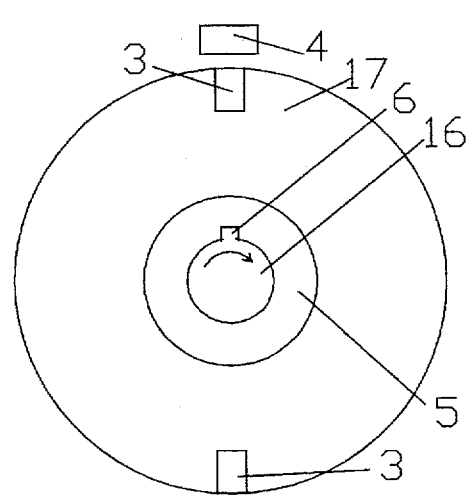
FIG. 8 is a frontal view of a disk of non-magnetic metal or plastic with magnets and pick-up for a two cycle, two cylinder single engine or a 4 cycle, two cylinder single engine or a two cycle, two cylinder reciprocal engine.

FIG. 10 is a frontal view of a disk of non-magnetic metal or plastic with magnets and pick-up coils for a two or four cycle, three cylinder double engine or a 6 cylinder reciprocal engine wherein two cylinders fire at the same time.

Figure 11:
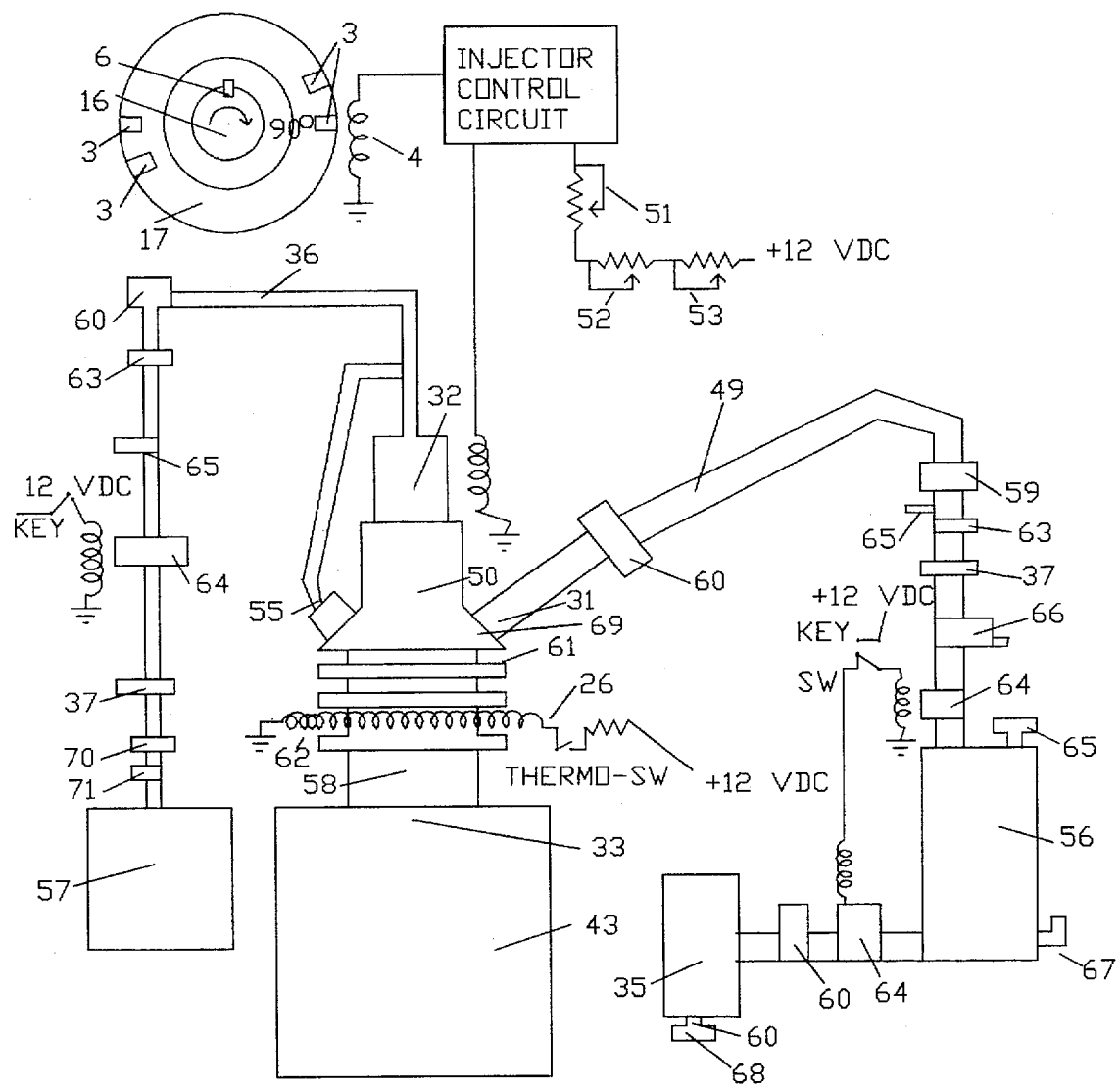

FIG. 11 is a functional diagram of a gaseous fuel injection system.

Figure 12:
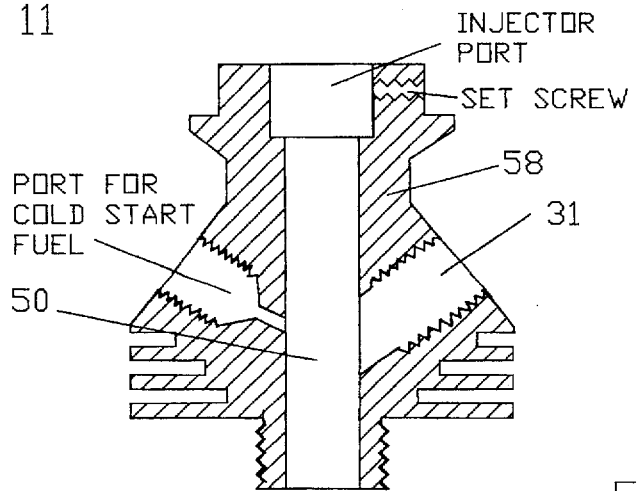

FIG. 12 is a cross-section of a fuel-air injector mixer.

DESCRIPTION OF PREFERRED EMBODIMENT

Figure 1:
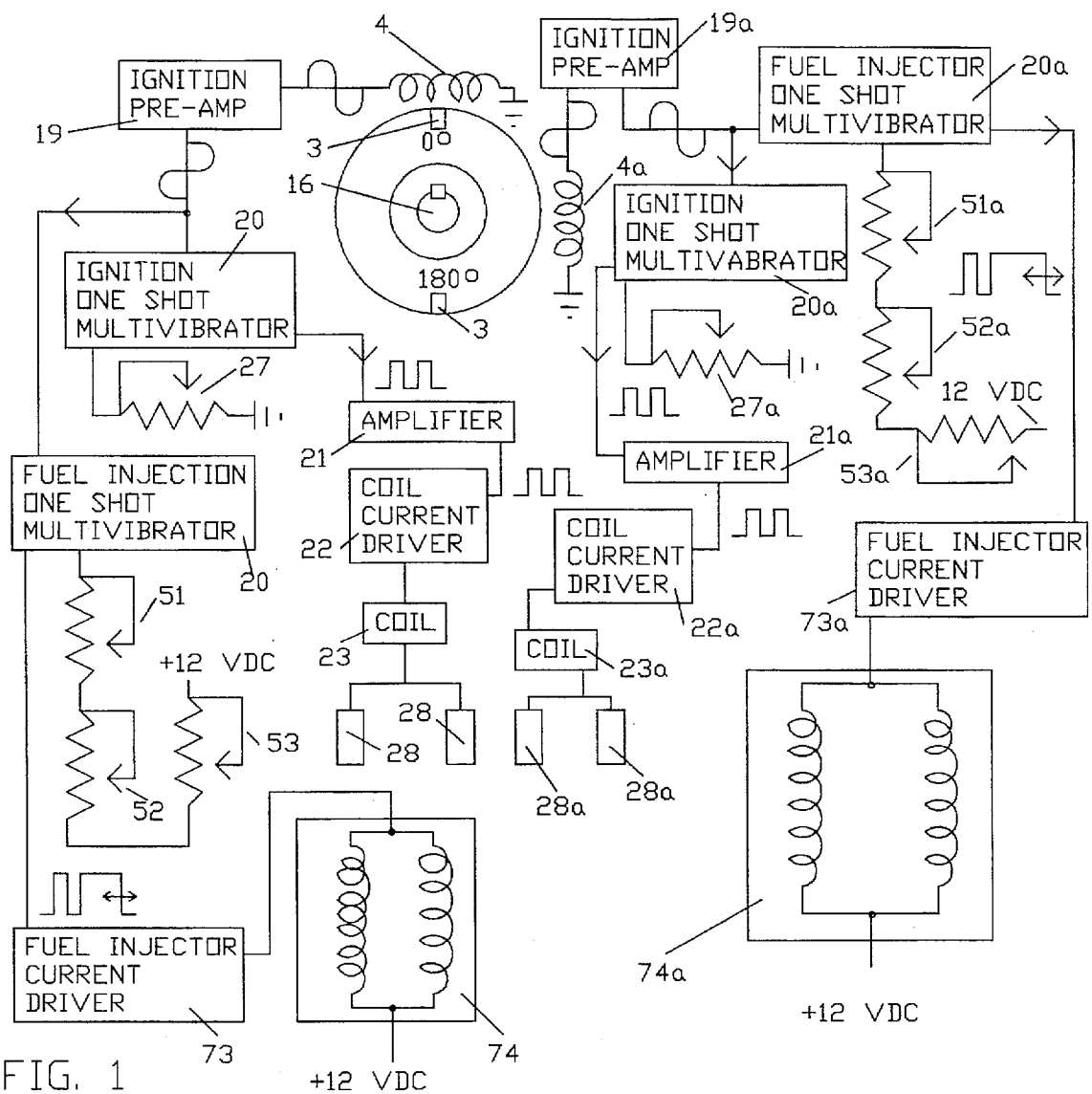
FIG. 1 is a functional diagram of combined ignition and fuel injection systems.

Referring to the drawings and in particular to FIG. 1, functional diagram of combined ignition and fuel electrical system of a typical two stroke, four cylinder double rotary-reciprocal engine. The ignition and fuel injection systems utilize a common timing mechanism fixed to shaft 16. This mechanism consist of a dust cover, a guide which rotates with the shaft 16, a stabilizing spring 9 which is attached to the guide plate 7 and a non-conductive magnet holding ring 17. The magnets 3 induce timing voltage pulses into pick-up coils 4 and 4a to generate timing signals for both ignition and fuel injection. The two stroke, four cylinder rotary-reciprocal engine's ignition and fuel system shown in FIG. 1 obtain compressed air from built-in air compressors within engine 1 and engine 2. One engine fires while the other engine is exhausting and injecting fuel and air, therefore, a simplified system with two pick-up coils can be used for timing both ignition and fuel injection. Each engine fires at 180 degree intervals. At 0 degree magnet 3 induces a 0.25 to 0.5 volt timing signal into pick-up coil 4. This timing signal is transfered by wire to the ignition pre-amplifier 19 where it is amplified sufficiently to trigger engine No. 2's ignition pulse forming one shot multivibrator 20. This multivibrator develops and shapes the square waves which are amplified 21 and applied to engine No. 2's coil current driver 22. The coil current driver 22 charges coil 23 which in turn generates ignition spark within spark plugs 28 for both cylinders within engine No. 2.

The ignition pre-amp's 19 output signal is also used to trigger engine No. 1's fuel injection one shot multivibrator 20. This stage develops a variable square wave which determines the injectors' fuel spraying duration. The duration of the injector ON cycle is determined by the throttle position rheostat 52. Rheostat 52 increases resistance as the throttle is opened for higher speeds. Additional resistance causes the one-shot multivibrator to produce a signal which has a longer duration to provide more injector spray time. Vacuum load control 53 detects when engine is under increased load. Additional load increases the resistance an provides additional fuel spraying time. Variable resistor 51 is controlled by air temperature. Cold air increases resistance and fuel spray time. The square wave signals developed by the fuel injection one-shot multivibrator 20 trigger's fuel injection current driver 73 which provides turn ON current for engine No. 1's injector coils. Fuel and air injection into engine No. 1 is taking place as engine No. 2 is compressing and firing.

Electrical circuits which are timed by pick-up coil 4a function in the same manner as described above with the exception of when they are triggered. Pick-up coil 4a develops a timing pulse 90 degree lagging pick-up coil 4. This pulse is used to activate ignition for engine No. 1 and fuel injection for engine No. 2.

Figure 2:
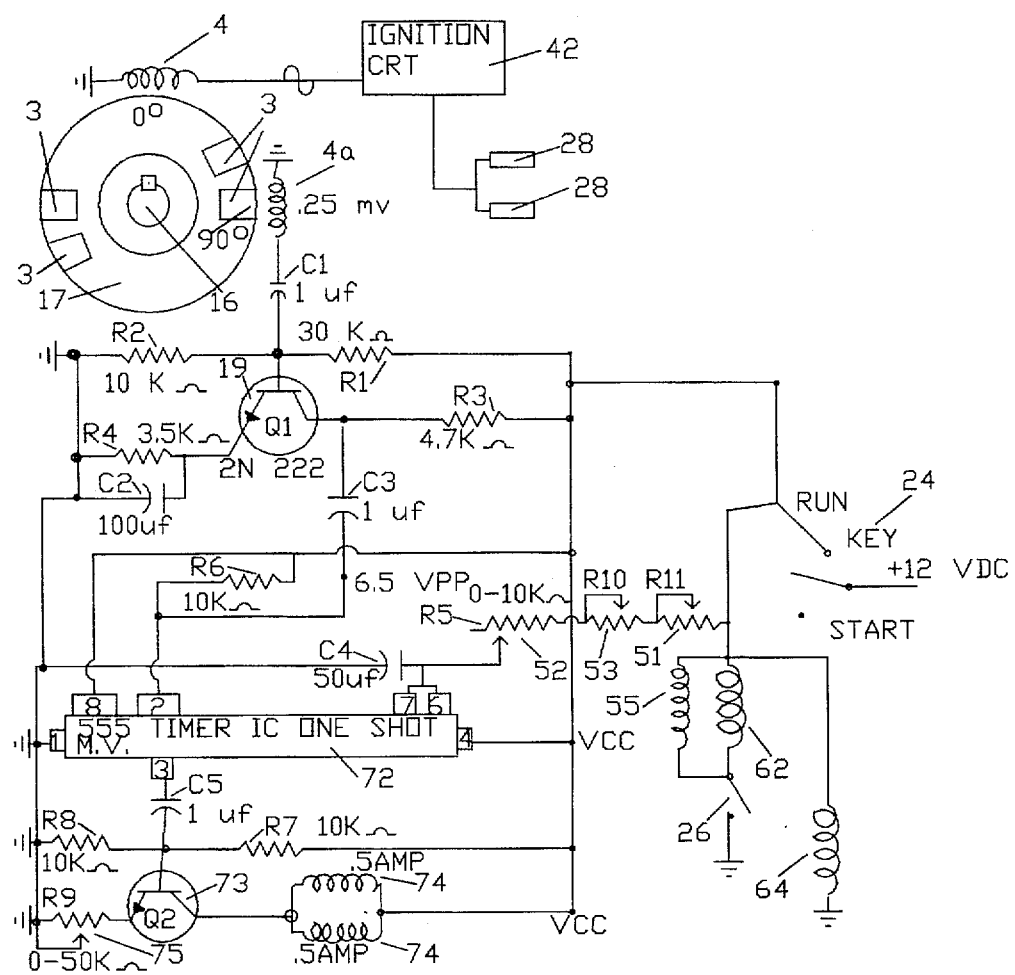
FIG. 2 is a detailed fuel injection circuit drawing.

Refer to FIG. 2 which provides a detailed electronic circuit used by fuel injectors. This drawing illustrates adaptability of the combined ignition and fuel injection systems. FIG. 2 shows how system would inject fuel and ignite the compressed air/fuel mixture. Magnet 3 induced a timing voltage in pick-up coil 4. This timing signal triggered the ignition circuit 42 and then fired the one engine's two cylinders simultaneously. The rotor's cylinders then exhaust as they rotate 90 degrees where magnet 3 and pick-up 4a develop a timing pulse for the fuel injection circuit components. This timing pulse is coupled through C 1 to pre-amp's 19 to amplify the injector trigger pulse. Pre-amp's 19 output is coupled by C 3 to a one-shot multivibrator 72 developed by a 555 integrated timing circuit. The one-shot multivibrator produces a square wave signal each time it is triggered. The duration of the one-shot multivibrator output signal on pin 3 is determined by the amount of resistance in the discharge path of C 4. When resistance increases in R 5 throttle position rheostat 52, in R 10 vacuum load control 53 or in air temperature fuel compensator 51 the fuel injector coils 74 hold valves open for additional fuel. Element 75 adjusts current to the injectors.

The output on pin 3 of the one-shot multivibrator 72 is coupled to fuel injector current driver 73 by way of C 5. Fuel injector current driver 73 provides the 0.5 amps of current required by injector coils 74 to open fuel injectors' valves.

When the weather is cold additional fuel is required. Cold start Bi-Metal switch 26 which is closed when cold is provided to energize a fuel by-pass path by cold start selnoid control valve 55. In addition a heater 62 is provided to stimulate gas molecules for better mixture and firing. Safety cut-off valves 64 close when the key is turned to OFF position. This maintains air and gas pressure for future start up.

Figure 3:
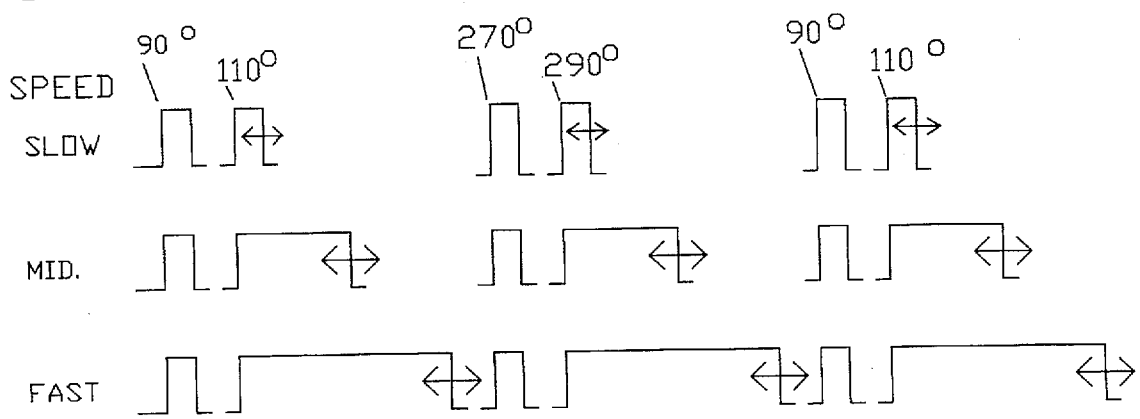
FIG. 3 is a diagram showing the relationship between engine speed and injector pulse duration.

FIG. 3 illustrates how injectors' 32 fuel spray time varies with fuel demands. The top signals reflect slow speed under limited load. Note that the injectors' timing signal is from the 90 degree pick-up coil. Note also that the injector spraying signals are first developed 90 degree then at 20 degrees later when second firing magnet induces a voltage into pick-up coil 4a. The first pulses triggers the one-shot multivibrator 72 which produces a short pulse before the second trigger overrides its impact on the multivibrator 72 and starts another controllable pulse. The injectors' fuel spray time is determined by the duration of the two pulses. The second pulse's duration is determined by the throttle position rheostat 52 and the vacuum load control 53.

Figure 4:
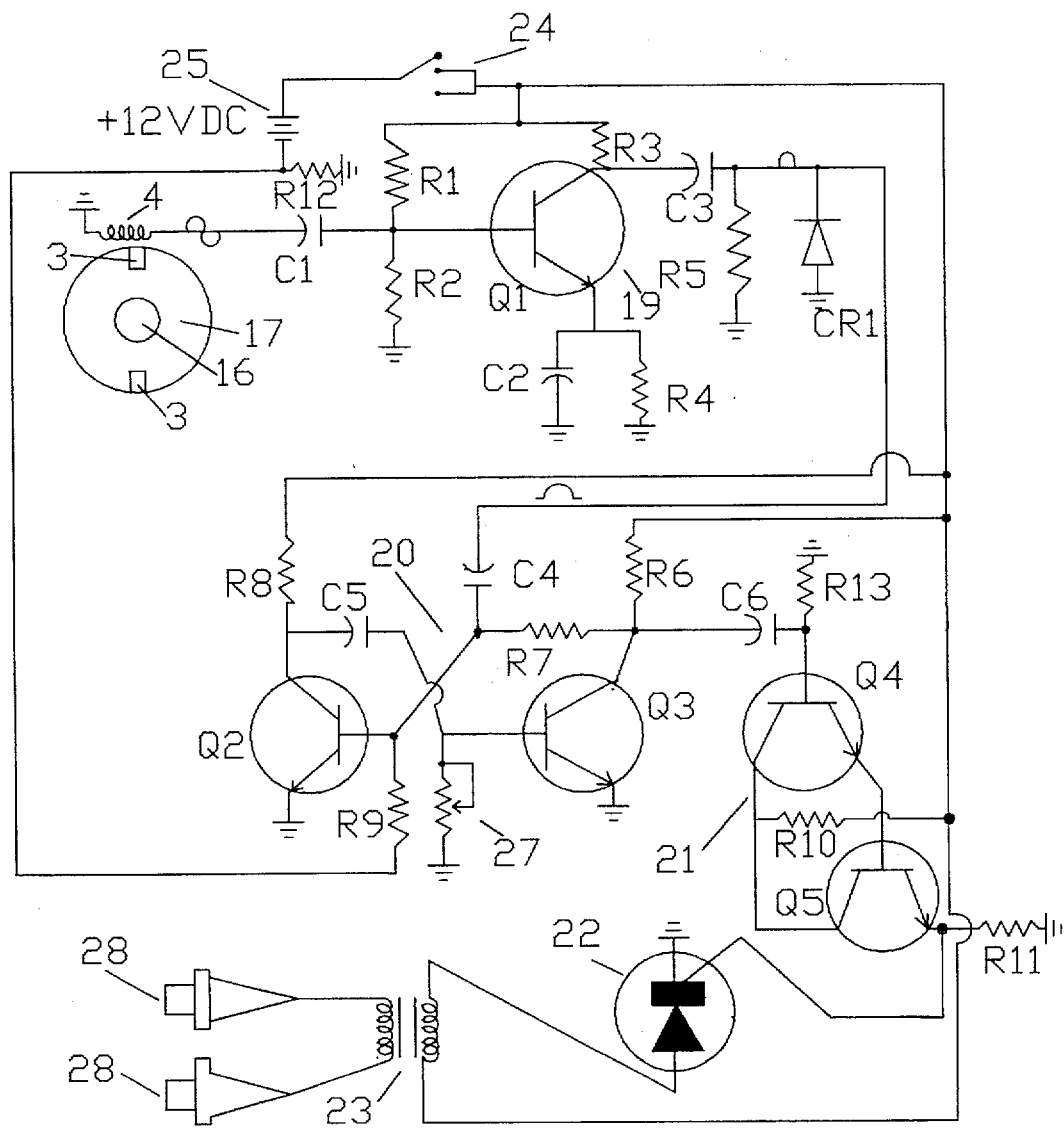
FIG. 4 is a detailed ignition circuit drawing.

FIG. 4 illustrates an ignition circuit. It provides spark plug ignition each time a magnet 3 induces a voltage into pick-up 4. Magnets 3 and pick-up 4 are arranged to produce accurate engine ignition and fuel injection timing to match each type engine. More than one ignition circuit may be used. The ignition timing pulse developed by magnet 3 and pick-up coil 4 is coupled through C 1 to the base of Q 1 which is the signal's pre-amplifier 19. Q 1's amplified output is coupled through C 3 to CR1 where the negative half of signal is shorted to ground. The remaining positive signal triggers the one-shot multivibrator 20. This stage produces a square wave pulse. The duration of this pulse is determined by the ignition dwell time adjustment 27. The square wave from Q 3 is coupled by C 6 to a solid state amplifier 21 which causes coil current driver 22 to allow high current to pass through the primary of duel coil 23. This high current generates high voltage in the coil's secondary to fire spark plugs 28.

Figure 5:
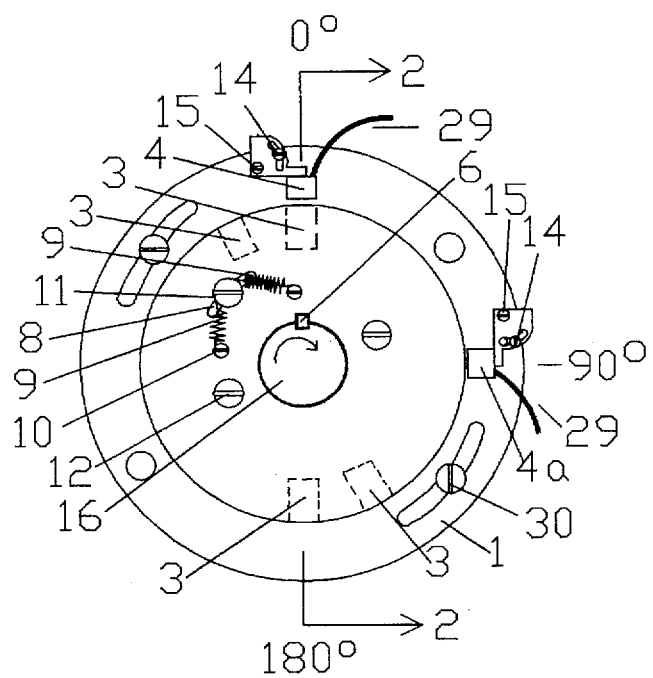
FIG. 5 is a frontal view of the timing mechanism.
Figure 6:
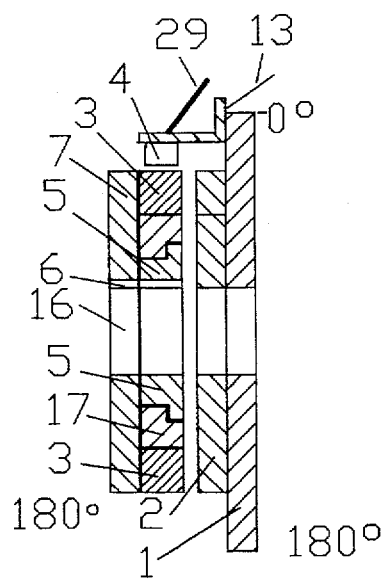
FIG. 6 is a cross-section of FIG. 5, the timing mechanism.
Figure 9:
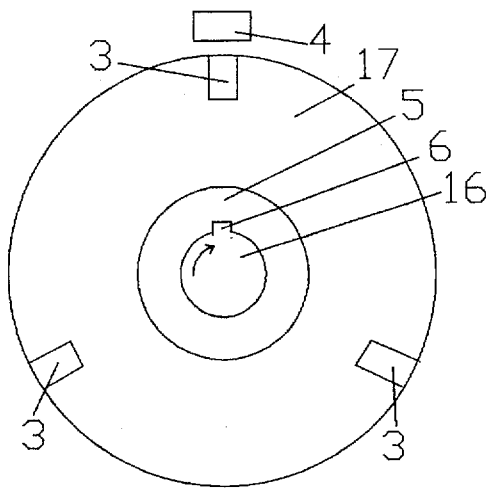
FIG. 9 is a frontal view of a disk of non-magnetic metal of plastic with magnets and pick-up coil for a two or four cycle, three cylinder double engine or a rotary engine or a two cycle, three cylinder reciprocal engine.

Referring to the drawing and in particular to FIG. 5 and FIG. 6 the timing mechanism for combustion engines with its dust cover removed which consist of a mounting ring 1 which is bolted within adjustment slots 30 to the engine and is stationary. The pick-up coil 4 is bolted to the mounting plate 1 by means of a bolt or fastener 15 and has slot 14 for adjusting the pick-up coil's 4 position. The pick-up coil 4 is connected by wire 29 to the electronic system. There is a engine bearing hub 2 which supports the mounting ring 1 and to the left of it is a non-magnetic disk which consist of an inner base 5 which has a hole to fit over the shaft 16 and is held in position by a key 6. It rotates with the shaft, and is bolted to the guide plate by bolts 12 which also rotates with the shaft. The disk also contains an outer magnet holding ring 17 which hold the magnets 3 in place. There are two springs 9 in front of the guide plate 7 which are attached to the guide plate 7 by bolt 10 and in the center by bolt 11. Bolt 11 fits into a slot 8 in the guide plate and bolts into the magnet holding ring 17 and allows the timing to be centrifugally advanced or retarded.

Referring to FIG. 7-10 which are frontal views of timing disks which shows the location and number of magnets on each disk and the location of the pick-up coils for the various types of single and double rotary-reciprocal, rotary and reciprocal engines. The single engines have one or more pick-up coils 4 and the double engines have two or more pick-up coils 4a.

Referring to FIG. 11 which is a functional diagram of a gaseous fuel injection system which utilizes clean burning gaseous fuel such as hydrogen, natural gas, propane or butane which is stored in a tank 57. The gaseous fuel is measured by a fuel level gage 71 and passes through a tank valve 70 into the fuel line 36. The pressure is regulated by a pressure regulator 37. The fuel line has a safety cut-off valve 64 when the key is off and has a pressure gage 65. This line has a gas flow control adjustment 63 and a Reed check valve 60. The fuel line is connected to the cold start solenoid valve 55 and the fuel injector 32. The fuel injector is connected to the fuel-air mixing chamber 50 of the fuel/air injector mixer 58. The air is drawn in through an air filter 68 passes a reed valve 60 into an air compressor 35, where the air is compressed then passed through another reed valve 60 and safety shut-off valve 64 into the air collector tank 56. The collector tank has a safety pressure relief valve and a pressure gage 65. The air flows into the air line 49 which contains a safety cut-off valve 64, a water trap 66, a pressure regulator 37, an air flow control adjustment valve 63, a pressure gauge 65, an air flow control valve 59 and another Reed valve 60. The air flows into the air mixing port then through air jets 69 into the fuel-air mixing chamber 50 which is illustrated in FIG. 12. When the fuel/air mixture is too hot it is cooled by cooling fins 61 and when it is too cool it is warmed by the fuel/air injector mixer heater 62 which is controlled by cold start Bi-Metal switch.

FIG. 11 also illustrates the fuel injector control system. The injector timing mechanism utilizes a disk 17 containing magnets 3 which are placed at the proper timing degrees and rotates with the shaft 16. The permanent magnet's 3 volt pulse is picked up by the pick-up coil 4 then is transferred by wire to the injector control circuit which opens the injector valve 32. The duration of the opened valve is regulated by the air temperature fuel compensator 51, throttle position rheostat 52 and vacuum load control 53.

OPERATION

The basic operation of the fuel injection system of this invention consist of the magnets 3 producing a magnetic field from the permanent magnets 3 which induce approximately 0.25 to 0.5 volt properly timed pulse into pick-up coils 4. This 0.25 to 0.5 volt pulses are transferred by wire to the associated electronic shaping and amplifying circuits. This signal is amplified by the Pre-Amplifier. The Pre-Amplifier output triggers a One Shot Multivibrator. The multivibrator circuit produces a positive going pulse. The duration of this pulse can be varied by three separated controls. These controls, Throttle Position Rheostat, Vacuum Load Control and Air Temperature Fuel Compensator accomplish the following functions:

A. Throttle Position Rheostat:

The throttle position rheostat changes the duration of the multivibrator's output. When the pulse width decreases the injector sprays less fuel and when the pulse width increases the injector remains open longer, therefore discharging more fuel. When the accelerator is pressed the throttle position rheostat increases resistance and the duration of the fuel injection control voltage is increased. As the accelerator pressure is decreased the throttle position rheostat control decreases resistant and the duration of the fuel injector control pulse is decreased, thereby decreasing the amount of fuel sprayed into the intake manifold.

B. Vacuum Load Control:

The vacuum load control 53 responds to engine load. The greater the load the more the vacuum drops. A drop in vacuum increases the resistance which results in longer duration of injector "turn-on" pulse thereby providing additional fuel for the increase load.

C. Cold Start Bi-metal Switch:

The cold start Bi-metal switch 26 closes when engine is cool. The closed position applies current to a fuel by-pass solenoid 55 which allows additional fuel to by-pass injector valves. When engine becomes warm the Bi-metal switch 26 opens and cuts off fuel by-pass. This decreases the fuel to the intake port.

D. Timing Voltage Pick-up Coils:

The timing voltage pick-up coils 4 have voltage induced into them by the magnets 3 on the disk as they rotate pass the pick-up coils 4. These timing signals provide fuel injection and ignition timing. When the 0 degree timing voltage pick-up coil 4 is charged by the magnetic field on a double two cycle rotary-reciprocal engine with two cylinders in each engine it may provide ignition timing voltage for engine No. 1 and fuel injection voltage timing for the opposite engine No. 2. This is possible because engine No. 1 is firing while engine No. 2 is taking in fuel and air. A second voltage pick-up coil 4 is at 90 degrees on a double two cycle rotary-reciprocal engine with two cylinders in each engine has voltage induced into it by the permanent magnets 3 every 180 degrees. These voltage pulses lag the 0 degree pulses by 90 degrees. Since these engines alternately fire every 90 degrees we can apply the engine No. 2, 90 degree ignition timing pulse to activate engine No. 1's fuel injection system.

E. Injector Control Circuit:

Injector control Pre-amplifier 19 amplify the 0.25 to 0.5 volts obtained from the voltage pick-up coil 4 and then triggers the one Shot Multivibrator circuit 72 to produce a square wave pulse each time it is triggered. The duration of this pulse is controlled by the total resistance in the three control variable resistors (51, 52 and 53). The longer the duration, the longer the fuel injector discharges fuel into the intake manifold for each trigger pulse. The total resistance produced by these three variable resistors is determined by the throttle position rheostat 52, vacuum load control 53 and air temperature fuel compensator 51 as explained above.

F. Air Temperature Fuel Compensator:

Air Temperature Fuel Compensator 51 thermistor in housing for intake air when heated decreases the resistance in the discharge path of C4 in the injection control circuit, thus causing output injector control signal to slightly decrease in fuel spraying time. When air is cold the output control signal slightly increases fuel spray.

G. Fuel Injector Current Driver:

The positive pulse produced by the one shot multivibrator circuit 72 increases current flow through Fuel Injector Current Driver 73. The injectors 74 open and spray fuel directly into the intake port or intake manifold near the intake ports. When the positive pulse ends the fuel injectors' shut off springs causes them to close. This type of system design could also be adapted to four stroke reciprocating combustion engines to develop computerless injection systems.

The fuel input mechanism consists of:

A. Standard gasoline tank for fuel storage;

B. Electric or mechanical fuel pump is used to produce 35 to 300 pounds of fuel pressure. The desired pressure is regulated by a fuel regulator 37.

C. Fuel pressure regulator 37 is utilized to maintain the fuel pressure at 35–200 psi. It by passes excess fuel back to the fuel tank. This provides fresh fuel to the pump to help keep it cool.

D. Fuel injector gas line 36 which provides a pressurized fuel connector source for the injectors. It also has a pressure check 60 and release 67 valves.

E. Fuel injectors are mounted on the fuel-air injector mixer 58 near the fuel intake ports. When the intake port open the fuel and air from the internal air compressor of a two cycle rotary-reciprocal or reciprocal engine are mixed. In a four cycle engine the air is sucked through a filter. The air may also be compressed by means of a compressor. The fuel injector's electro-magnetic coil 74 opens the injector when the injector switching circuit applies energizing current. Spring pressure closes the injectors when fuel injector current driver 73 cut off the current through injector coils.

The air input consist of:

A. Filtered air 68 for fuel air mixture is obtained through the reed check valve 60 pathway into a compressing chamber 35 in the two cycle rotary-reciprocal or reciprocal combustion engines where it is compressed, The filtered air is vacuumed in through a carburetor in a 4 cycle combustion engine or may be compressed by a compressor. The reed valve check component 60 for two cycle engines contains an air input air flow control valve 59 similar to a standard carburetor. Also attached to the reed valve component is a throttle position rheostat 52 which is used to control fuel injector's spray duration. In a two cycle or four cycle engine the air may be compressed and injected directly into the cylinder chambers during the compression strokes.

B. In a two cycle double rotary-reciprocal engine, one engine vacuums in the fuel/air mixture as the other engine compresses the fuel/air mixture. The air compressor in the center of the engine No. 1 vacuums air from the reed check valve 60 component and this air is compressed when the other engine, No. 2, fires. The reed valve is closed by the compressed air. This compressed air is transferred through input ports of the other engine, No. 2, and the fuel is injected by the injectors into the fuel-air injector mixer 58 at the fuel intake port, Engine No. 2 vacuums in air and fuel as engine, while No. 1, compresses it's fuel/air mixture. The compressed air and fuel under pressure may be injected directly into the cylinder chambers after the exhaust ports are closed during the compression stroke.

The basic operation of the fuel injection system illustrated in FIG. 2 and FIG. 11, which utilizes a gaseous fuel in this invention consist of the permanent magnets 3 which induce approximately 0.250 to 0.5 volt pulse properly timed into pick-up coils 4. This timing pulse is transferred by wire to the associated pre-amp. 19. Pre-amp may amplify for both the ignition and fuel/air injection systems. The fuel injection system utilizes a separate one shot multivibrator circuit 72 because pulse duration must be changed to assure proper fuel injection for various speeds and loads. The frequency (engine speed) and the duration of the positive half of the square waves produced by the one-shot multivibrator 72, along with fuel/air pressure and size of the injector valve opening determine the amount of fuel and air injected into the cylinder during fuel/air intake cycle. This system is designed for a 1 to 16 fuel to air mixture ratio.

Refer to figure FIG. 11 which illustrates using clean burning gases such as hydrogen, methane (natural gas), butane or propane, in this system which is designed so that the rotary-reciprocal engine's built in air compressor pumps air into an Air Collector Tank 56. Engines other than rotary-reciprocal types would require a separate air compressor. When the engine's key is turned to OFF, solenoid shut off safety cut OFF valves 64 to maintain air pressure within the air collector tank 56 and to cut fuel OFF to prevent gas from escaping in the event that the intake and/or exhaust ports are open.

The intake ports 33 are designed to open after the exhaust ports have expelled most of the expended fuel gases. Air flowing from intake port 33 prior to the fuel injector solenoid 74 being activated assist in the exhaust process. As the exhaust ports 76 are closed the fuel injectors 32 are activated, thus preventing fuel from escaping along with the exhaust. The injectors' fuel valves 32 and air injection openings 31 in the Fuel-air Injection Mixers 58 are designed to allow their equally (80 lbs.) pressurized gases to agitate together within the compressed Fuel and Air Mixer Chamber 50. A different fuel and air pressure ratio is typically required when liquid fuels are used. Pressure regulators 37 are used to change pressures.

To assure efficiency and enhance start-up during cold weather a 12 volt heater 62 is provided to properly heat the fuel and air for better firing. Air cooling fins 61 are provided to prevent excessive heat buildup within the air fuel mixing chamber 50.

Fuel and Air Pressure Regulators 37 provide constant gas/air pressures. Fuel and Air flow controls 63 are adjusted to assure proper fuel-air mixtures. After the fuel/air mixture ratios are established the proper ratio is maintained by the Throttle Position Rheostat 52, vacuum load control 53 and the Air Flow Control Valve 59. At higher speeds the Throttle Position Rheostat 52 causes the injection valve to remain open for a longer duration each time the injector is activated. Air flow for proper fuel/air ratio is maintained by Air Flow Control Valve 59. This butterfly type valve is controlled by the engine speed control device. At slower engine speeds this air flow control valve is almost closed, at higher speeds the valve is opened to maintain higher air flow.

Safety reed check valves 60 are provided to prevent "out of time" explosive gases from reaching the fuel and air tanks. A Safety Pressure Relief Valve 67 is provided to assure that the air tank does not become over pressurized.

Additional fuel is provided for cold starts. This is accomplished by a Cold Start Solenoid Control Valve 55 which allows a small amount of additional fuel to by-pass the injector and enter directly into the Fuel-Air Injector Mixer Chamber 50. The Cold Start Solenoid is deactivated when the Cold Start Bi-Metal Switch 26 opens due to the engine reaching proper temperature. When this cold start switch opens it also removes the current applied to the Fuel-Air Injector Mixer Heater 62.

I claim:

1. A combined ignition and fuel injection system for an engine comprising:

variable resistance sensor means for manifold pressure, throttle position, and air temperature;

a crankshaft position sensor means comprising at least one magnet on a disk adapted to be rotated by a crankshaft;

circuit means comprising a pick-up coil responsive to said at least one magnet to output a signal to a first amplifier which is operable to send a signal to both an ignition multivibrator and a fuel injection multivibrator, each of said variable sensor means connected to said fuel multivibrator to control the duration of each fuel injection pulse, and variable resistance dwell control means to control the duration of an ignition signal from said ignition multivibrator.

2. The system according to claim 1, wherein said circuit means further comprises a fuel injector current driver connected to the fuel multivibrator and is adapted to drive at least one fuel injector.

3. The system according to claim 1, wherein said circuit means further comprises second amplifier connected between said ignition multivibrator and a coil driver, said coil driver further connected to a coil adapted to drive at least one spark plug.

4. The system according to claim 1, wherein said multivibrators are one shot multivibrators adapted to output a square wave.

5. The system according to claim 1, further comprising fuel injectors adapted to receive pressurized gaseous fuel and pressurized air.

6. The system according to claim 5, wherein said fuel injectors comprise a cold start port and electric heating means.

7. The system according to claim 1, wherein there are a plurality of circuit means responsive to said crankshaft sensor means.

* * * * *